(12) United States Patent
Looker

(10) Patent No.: US 7,942,618 B1
(45) Date of Patent: May 17, 2011

(54) CARGO COVER AND NET ASSEMBLY

(75) Inventor: Robert Looker, Carpinteria, CA (US)

(73) Assignee: Satco, Inc., El Segundo, CA (US)

(*) Notice: Subject to any disclaimer, the term of this patent is extended or adjusted under 35 U.S.C. 154(b) by 448 days.

(21) Appl. No.: 12/179,304

(22) Filed: Jul. 24, 2008

(51) Int. Cl.
*B60P 7/08* (2006.01)

(52) U.S. Cl. .......................... 410/97; 410/118

(58) Field of Classification Search .................. 410/96, 410/97, 100, 117, 118; 87/2, 12; 206/597; 248/499
See application file for complete search history.

(56) References Cited

U.S. PATENT DOCUMENTS

| | | | |
|---|---|---|---|
| 7,766,590 B2 * | 8/2010 | Mapitigama et al. | ........... 410/97 |
| 2008/0003075 A1 | 1/2008 | Mapitigama et al. | |

* cited by examiner

*Primary Examiner* — Stephen Gordon
(74) *Attorney, Agent, or Firm* — Kenneth H. Ohriner; Perkins Coie LLP

(57) ABSTRACT

A cargo pallet cover and net assembly includes a cargo cover attached to a cargo net. The cargo net is attached to upper and lower side regions of the cargo cover so that the cargo cover and net assembly may be placed over a cargo load in one step. The cargo net is optionally attached at or near the lowermost side regions of the cargo cover so that the cargo cover is substantially prevented from obstructing attachment of the cargo net to a pallet on which the cargo load is supported.

20 Claims, 3 Drawing Sheets

SECTION C-C

SECTION B-B

SECTION A-A

CARGO COVER AND NET ASSEMBLY

BACKGROUND

Air cargo is commonly loaded onto a pallet and secured to the pallet via a cargo net before being loaded into an aircraft. The cargo net is typically attached to the pallet to secure the cargo load to the pallet. Oftentimes, a cargo cover, such as a tarp or "pallet bag," will first be placed over the cargo load, after which the cargo net is positioned over the cargo cover. This cargo cover may provide additional protection for the cargo load against fire, water, excessive heat or cold, and so forth.

While cargo pallet covers are generally effective at protecting cargo loads, they can present difficulties during the covering and securing processes. For example, if the cargo load is not uniform, the cargo cover could bunch up or hang down beyond the cargo net securement points on the pallet, thus obstructing attachment of the cargo net to the pallet. As a result, additional time and effort are often required to secure a cargo load to a cargo pallet when a cargo pallet cover is used.

SUMMARY

A cargo pallet cover and net assembly includes a cargo cover attached to a cargo net. The cargo net is attached to upper and lower side regions of the cargo cover so that the cargo cover and net assembly may be placed over a cargo load in one step. The cargo net is optionally attached at or near the lowermost side regions of the cargo cover so that the cargo cover is substantially prevented from obstructing attachment of the cargo net to a pallet on which the cargo load is supported. Other features and advantages will appear hereinafter. The features described above can be used separately or together, or in various combinations of one or more of them.

BRIEF DESCRIPTION OF THE DRAWINGS

In the drawings, wherein the same reference number indicates the same element throughout the views.

DETAILED DESCRIPTION OF THE DRAWINGS

Various embodiments of the invention will now be described. The following description provides specific details for a thorough understanding and enabling description of these embodiments. One skilled in the art will understand, however, that the invention may be practiced without many of these details. Additionally, some well-known structures or functions may not be shown or described in detail so as to avoid unnecessarily obscuring the relevant description of the various embodiments.

The terminology used in the description presented below is intended to be interpreted in its broadest reasonable manner, even though it is being used in conjunction with a detailed description of certain specific embodiments of the invention. Certain terms may even be emphasized below. Any terminology intended to be interpreted in any restricted manner, however, will be overtly and specifically defined as such in this detailed description section.

Where the context permits, singular or plural terms may also include the plural or singular term, respectively. Moreover, unless the word "or" is expressly limited to mean only a single item exclusive from the other items in a list of two or more items, then the use of "or" in such a list is to be interpreted as including (a) any single item in the list, (b) all of the items in the list, or (c) any combination of items in the list.

Figure 1:
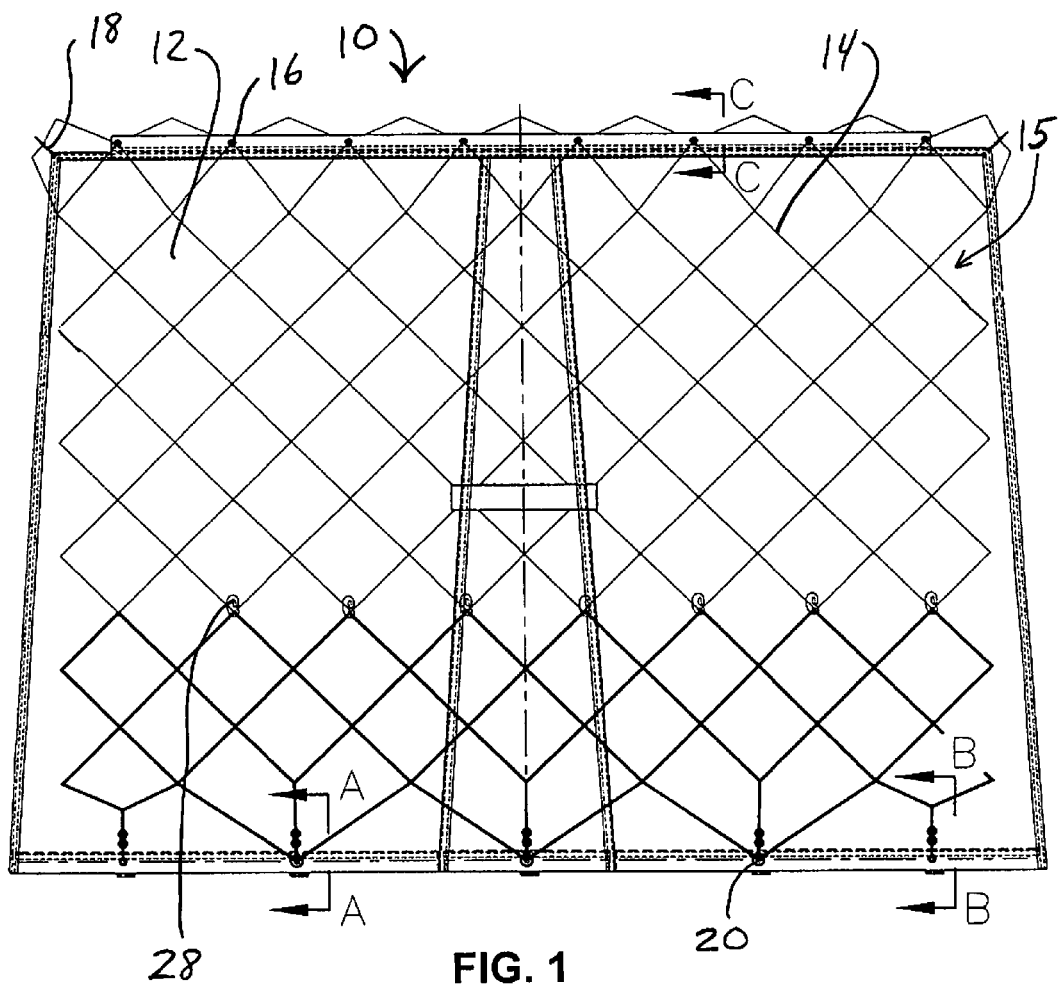
FIG. 1 is a side view of a cargo cover and net assembly, according to one embodiment.
Figure 2:
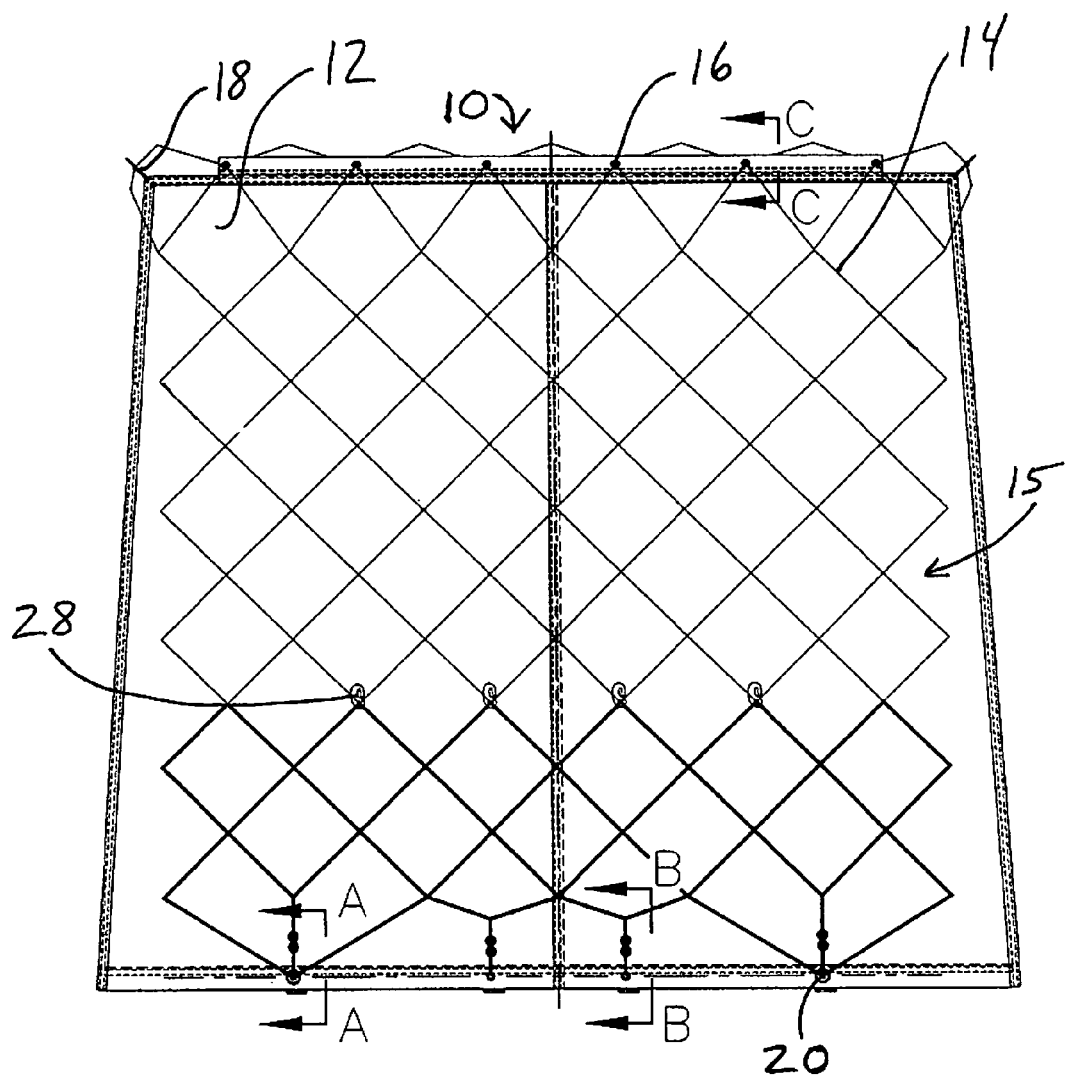
FIG. 2 is an end view of the cargo cover and net assembly shown in FIG. 1.

Turning now in detail to the drawings, as shown in FIGS. 1 and 2, a cargo cover and net assembly 10 includes a pallet bag or cargo cover 12 attached to a cargo net 14. The cargo cover 12 includes a top section (not visible in the drawings) and side sections 15 extending downwardly from the top section. The top section is preferably rectangular but could be any suitable shape. Each of the side sections 15 is preferably substantially rectangular, or substantially trapezoidal to allow for some slack in the corner regions of the cargo cover 12. The side sections 15 may alternatively be any other suitable shape.

The cargo cover 12 may be made of any material suitable for protecting a cargo load. In one embodiment, the cargo cover 12 is made of a fireproof or waterproof textile material. Depending on the nature of the cargo being transported, different cover types and materials may be used to protect the cargo load.

Figure 3:
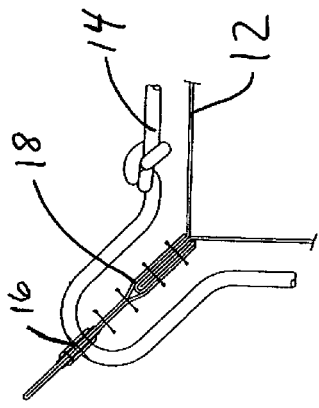
FIG. 3 is a sectional view of Section C-C of FIGS. 1 and 2.

An upper region of each of the side sections 15 (or, alternatively, an upper surface of the top section) includes multiple securement openings 16 through which the cargo net 14 passes. In one embodiment, a series of securement members 18 project outwardly from the cargo cover 12. As shown in FIG. 3, each securement member 18 includes an opening 16 through which a strand of the cargo net 14 passes. The securement members 18 substantially prevent twisting of the cargo net 14 relative to the cargo cover 12. In an alternative embodiment, the securement members 18 may be omitted and the securement openings 16 may be located directly in the cargo cover 12 itself.

Figure 5:
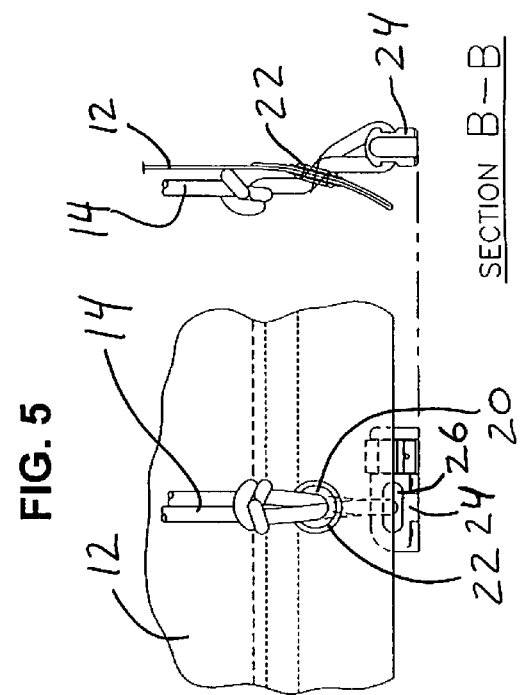
FIG. 5 is a side view and a corresponding sectional view of Section B-B of FIGS. 1 and 2.
Figure 4:
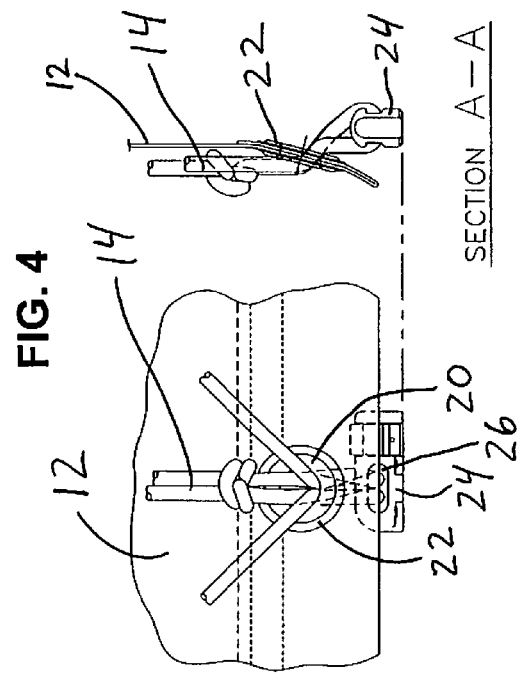
FIG. 4 is a side view and a corresponding sectional view of Section A-A of FIGS. 1 and 2.

A lower region of each of the side sections 15 also includes multiple securement openings 20 through which the cargo net 14 passes. As shown in FIGS. 4 and 5, each opening 20 is preferably reinforced with one or more metal or plastic rings 22 secured to the cargo cover 12 via clamping, press fitting, stitching, or another suitable connection method. The openings 20 are preferably located adjacent to bottom edges of the side sections 15 so that bottom strands of the cargo net 14 pass through a substantially lowermost region of the cargo cover 12. In this manner, the cargo cover 12 does not hang appreciably below the cargo net 14 and therefore does not obstruct the net 14 from being attached to a cargo pallet. In an alternative embodiment, securement members similar to those described above may be used in place of the securement openings 20 in the cargo cover 12.

Any suitable number of upper securement openings 16 and lower securement openings 20 may be included on or in the cargo cover 12. For ease of assembly and efficiency of use, it is preferable that the spacing between the securement openings is substantially equal to the spacing between neighboring strands of the cargo net 14. Because the strands of the cargo net 14 pass through the upper and lower securement openings 16 and 20, the cargo net 14 is essentially permanently attached to the cargo cover 12 while it remains intact.

Pallet fittings 24 or similar devices are attached to the lowermost regions of the cargo net 12 for engagement with corresponding openings in, or fittings on, a cargo pallet. The pallet fittings 24 are securable to the cargo pallet for securing a cargo load on the pallet beneath the cargo cover 12. The pallet fittings 24 preferably include openings 26 through which strands of the cargo net 12 pass to secure the fittings 24 to the net 12. Alternatively, the pallet fittings 24 may include hooks or cleats around which strands of the cargo net may be tied.

As shown in FIGS. 4 and 5, the pallet fittings 24 are preferably secured to strands of the cargo net 14 that pass from an exterior of the cargo cover 12, through the securement openings 20, and into an interior of the cargo cover 12. In this manner, the pallet fittings 24, which are preferably larger than the diameter of the securement openings 20, prevent the strands from being pulled back through the openings 20. Thus, the pallet fittings 24 optionally aid in securing the cargo net 14 to the cargo cover 12.

As shown in FIGS. 1 and 2, the cargo net 14 optionally includes cinching hooks 28, preferably located on the lower half of each side section of the cargo net 14. When an uneven or incomplete load is positioned on a cargo pallet, portions of the cargo cover 12 and cargo net 14, and thus, the attached pallet fittings 24, may hang down beyond the fitting attachment points on the pallet. To alleviate this problem, low-hanging strands of the cargo net 14 may be pulled up and placed over the cinching hooks 28 to take up slack in the net 14 and, consequently, slack in the cargo cover 12 attached to the lower region of the net 14. As a result, the pallet fittings 24 are moved to a position from which they can more easily be attached to the pallet.

The openings 20 in the lower regions of the cargo cover 12 are preferably located adjacent to the bottom edges of the side sections 15 so that the cargo cover 12 does not hang down substantially beyond the lowermost region of the cargo net 14 when portions of the net 14 are placed over the cinching hooks 28. In existing designs in which a cargo net is attached to a higher region on the cargo cover, cinching the lower region of the cargo net (which hangs down below the net attachment points) will not necessarily raise the bottom of the cargo cover above the fitting attachment points on the cargo pallet. Thus, the cargo cover in these existing designs may obstruct attachment of the pallet fittings to the cargo pallet.

In use, after goods are loaded onto a cargo pallet, the cargo cover and net assembly 10 may be lowered over the goods in one step. The pallet fittings 24 may then be secured to the corresponding openings in, or fittings on, the cargo pallet. If there is any slack in the cargo cover and net assembly 10, portions of the cargo net 14 may be pulled up and placed over the cinching hooks 28 to remove the slack in the cargo net 14 and the attached cargo cover 12. This step may be performed before or after securing the pallet fittings 24 to the cargo pallet. As described above, in some circumstances it may be preferable to first cinch portions of the cargo next 14 so that the pallet fittings 24 can be more easily attached to the cargo pallet without obstruction from the cargo cover 12.

Any of the above-described embodiments may be used alone or in combination with one another. Furthermore, the cargo cover and net assembly may include additional features not described herein. While specific embodiments have been shown and described, various changes and substitutions may of course be made, without departing from the spirit and scope of the invention. The invention, therefore, should not be limited, except by the following claims and their equivalents.

What is claimed is:

1. A cargo cover and net assembly, comprising:
   a cargo cover including a top section and a plurality of side sections extending from the top section;
   a plurality of upper securement elements, each including an opening, positioned along an upper region of each of the side sections;
   a plurality of lower securement elements, each including an opening, positioned along a lower region of each of the side sections; and
   a cargo net including strands passing through the openings in the upper and lower securement elements to secure the cargo net to the cargo cover, wherein a plurality of bottom strands of the cargo net pass through the openings in the lower securement elements from an exterior to an interior of the cargo cover.

2. The cargo cover and net assembly of claim 1 wherein the upper securement elements comprise outwardly projecting members, with each outwardly projecting member including at least one opening.

3. The cargo cover and net assembly of claim 1 wherein the lower securement elements comprise reinforced openings in the cargo cover.

4. The cargo cover and net assembly of claim 3 wherein each of the reinforced openings is reinforced by at least one metal or plastic ring.

5. The cargo cover and net assembly of claim 1 wherein each of the side sections includes a bottom edge, and wherein the lower securement elements are located adjacent to the bottom edges of the side sections.

6. The cargo cover and net assembly of claim 1 further comprising a plurality of pallet engagement fittings attached to the bottom strands extending into the interior of the cargo cover.

7. The cargo cover and net assembly of claim 1 further comprising a plurality of cinching hooks on the cargo net.

8. The cargo cover and net assembly of claim 1 wherein the top section of the cargo cover is substantially rectangular, and the side sections of the cargo cover are substantially trapezoidal.

9. A cargo cover and net assembly, comprising:
   a cargo cover including a top section and a plurality of side sections extending from the top section, with each of the side sections including a bottom edge;
   a plurality of outwardly projecting securement members, each including at least one upper opening, positioned along an upper region of each of the side sections or along an upper surface of the top section;
   a plurality of lower openings in the cargo cover located adjacent to the bottom edges of the side sections; and
   a cargo net including strands passing through the upper openings and the lower openings to secure the cargo net to the cargo cover, including a plurality of bottom strands of the cargo net passing through the lower openings from an exterior to an interior of the cargo cover.

10. A cargo cover and net assembly, comprising:
    a cargo cover including a top section and a plurality of side sections extending from the top section;
    a plurality of upper openings positioned along an upper region of each of the side sections or along an upper surface of the top section;
    a plurality of lower openings in the cargo cover positioned along a lower region of each of the side sections;
    a cargo net including strands passing through the upper and lower openings to secure the cargo net to the cargo cover, wherein a plurality of lower strands of the cargo net pass through the lower openings in the cargo cover from an exterior to an interior of the cargo cover.

11. The cargo cover and net assembly of claim 9 further comprising a plurality of pallet engagement fittings attached to the bottom strands extending into the interior of the cargo cover.

12. The cargo cover and net assembly of claim 9 wherein each of the lower openings is reinforced by at least one metal or plastic ring.

13. The cargo cover and net assembly of claim 9 further comprising a plurality of cinching hooks on the cargo net.

14. The cargo cover and net assembly of claim 9 wherein the top section of the cargo cover is substantially rectangular, and the side sections of the cargo cover are substantially trapezoidal.

15. The cargo cover and net assembly of claim 10 further comprising a plurality of pallet engagement fittings attached to the lower strands extending into the interior of the cargo cover.

16. The cargo cover and net assembly of claim 10 wherein each of the lower openings is reinforced by at least one metal or plastic ring.

17. The cargo cover and net assembly of claim 10 wherein each of the side sections includes a bottom edge, and wherein the lower openings are located adjacent to the bottom edges of the side sections.

18. The cargo cover and net assembly of claim 10 further comprising a plurality of cinching hooks on the cargo net.

19. The cargo cover and net assembly of claim 10 wherein the top section of the cargo cover is substantially rectangular, and the side sections of the cargo cover are substantially trapezoidal.

20. The cargo cover and net assembly of claim 15 wherein each of the pallet engagement fittings includes an opening through which at least one of the lower strands passes to secure the pallet engagement fitting to the cargo net.

* * * * *